US009539748B2

(12) United States Patent
Bodet et al.

(10) Patent No.: US 9,539,748 B2
(45) Date of Patent: Jan. 10, 2017

(54) INJECTION-MOLDING PRESS

(75) Inventors: Hervé Bodet, Verdun (FR); Dominique Fournet, Belleville sur Meuse (FR)

(73) Assignee: LINDAL FRANCE SAS, Briey (FR)

( * ) Notice: Subject to any disclaimer, the term of this patent is extended or adjusted under 35 U.S.C. 154(b) by 540 days.

(21) Appl. No.: 14/004,787

(22) PCT Filed: Mar. 20, 2012

(86) PCT No.: PCT/EP2012/054870
§ 371 (c)(1),
(2), (4) Date: Sep. 12, 2013

(87) PCT Pub. No.: WO2012/136472
PCT Pub. Date: Oct. 11, 2012

(65) Prior Publication Data
US 2013/0341828 A1    Dec. 26, 2013

(30) Foreign Application Priority Data
Apr. 4, 2011  (FR) ...................... 11 52864

(51) Int. Cl.
B29C 45/14    (2006.01)
B29C 33/76    (2006.01)
B29L 23/20    (2006.01)

(52) U.S. Cl.
CPC ......... B29C 45/14008 (2013.01); B29C 33/76 (2013.01); B29C 45/14598 (2013.01); *B29C 2045/14934* (2013.01); *B29L 2023/20* (2013.01)

(58) Field of Classification Search
CPC ................... B29C 45/14008; B29C 45/14598; B29C 2045/14606; B29C 2045/14934; B29L 2023/20
See application file for complete search history.

(56) References Cited

U.S. PATENT DOCUMENTS 2,713,369 A  *  7/1955  Strahm ................... B29C 66/63
                                                        220/613
2,778,533 A  *  1/1957  Savary .............. B29C 45/14598
                                                        222/498
(Continued)

FOREIGN PATENT DOCUMENTS

FR           1300212 A   *   8/1962   ......... B29C 33/0044
FR           2527510 A1      12/1983
(Continued)

OTHER PUBLICATIONS

Partial machine translation of FR1300212A dated Aug. 1962 obtained from the espace website.*

(Continued)

*Primary Examiner* — Robert B Davis
(74) *Attorney, Agent, or Firm* — Westerman, Hattori, Daniels & Adrian, LLP

(57) ABSTRACT

An injection-molding press for overmolding a second part onto a first part (8) includes a movable portion and a fixed portion, with a first mold element (11, 12) on one of the press portions and a second mold element (20) on the other press portion so as to form a cavity (C) between the mold portions when the press is closed. The first mold portion (11, 12) has a first support surface (125*a*) movable in the first mold portion and the second mold portion (20) has a second support surface (22*a*). In the closed position of the press with a first part (8) in the first mold portion and the first support surface (125*a*) advanced in the working position, at least a portion (8*b*) of the front end of the first part (8) is clamped between the two support surfaces (125*a*, 22*a*), forming a tight seal for the cavity (C).

21 Claims, 2 Drawing Sheets

(56) References Cited

U.S. PATENT DOCUMENTS

| | | | |
|---|---|---|---|
| 4,496,513 A | 1/1985 | Ishikawa et al. | |
| 4,518,554 A | 5/1985 | Hatakeyama et al. | |
| 4,806,301 A | 2/1989 | Conti | |
| 7,396,221 B2* | 7/2008 | Bergami | B29C 31/008 |
| | | | 425/112 |

FOREIGN PATENT DOCUMENTS

| | | |
|---|---|---|
| FR | 2532882 A1 | 3/1984 |
| JP | 05-008260 A | 1/1993 |

OTHER PUBLICATIONS

International Search Report dated Jun. 20, 2012, issued in corresponding application No. PCT/EP2012/054870.
International Written Opinion dated Jun. 20, 2012 (English translation), issued in corresponding application No. PCT/EP2012/054870 (8 pages).

* cited by examiner

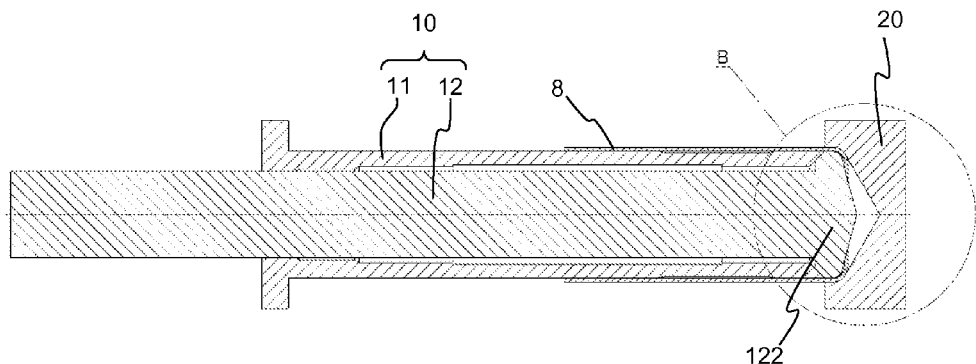
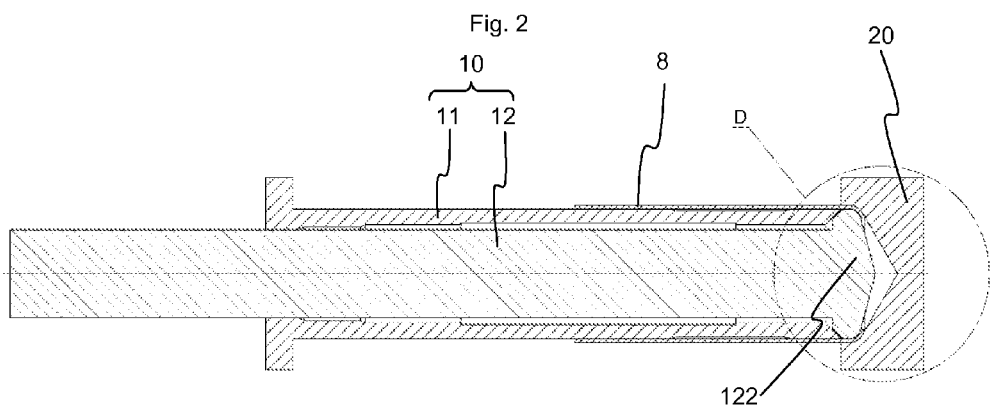
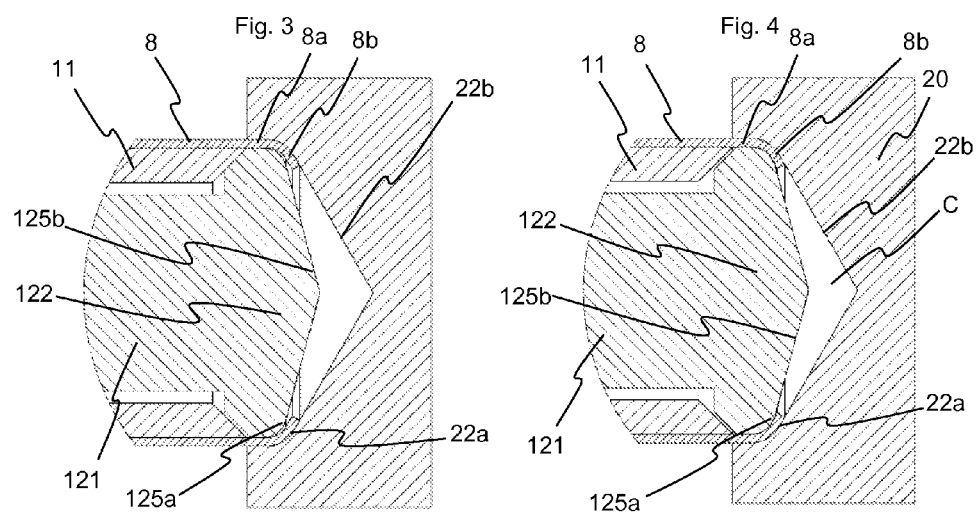

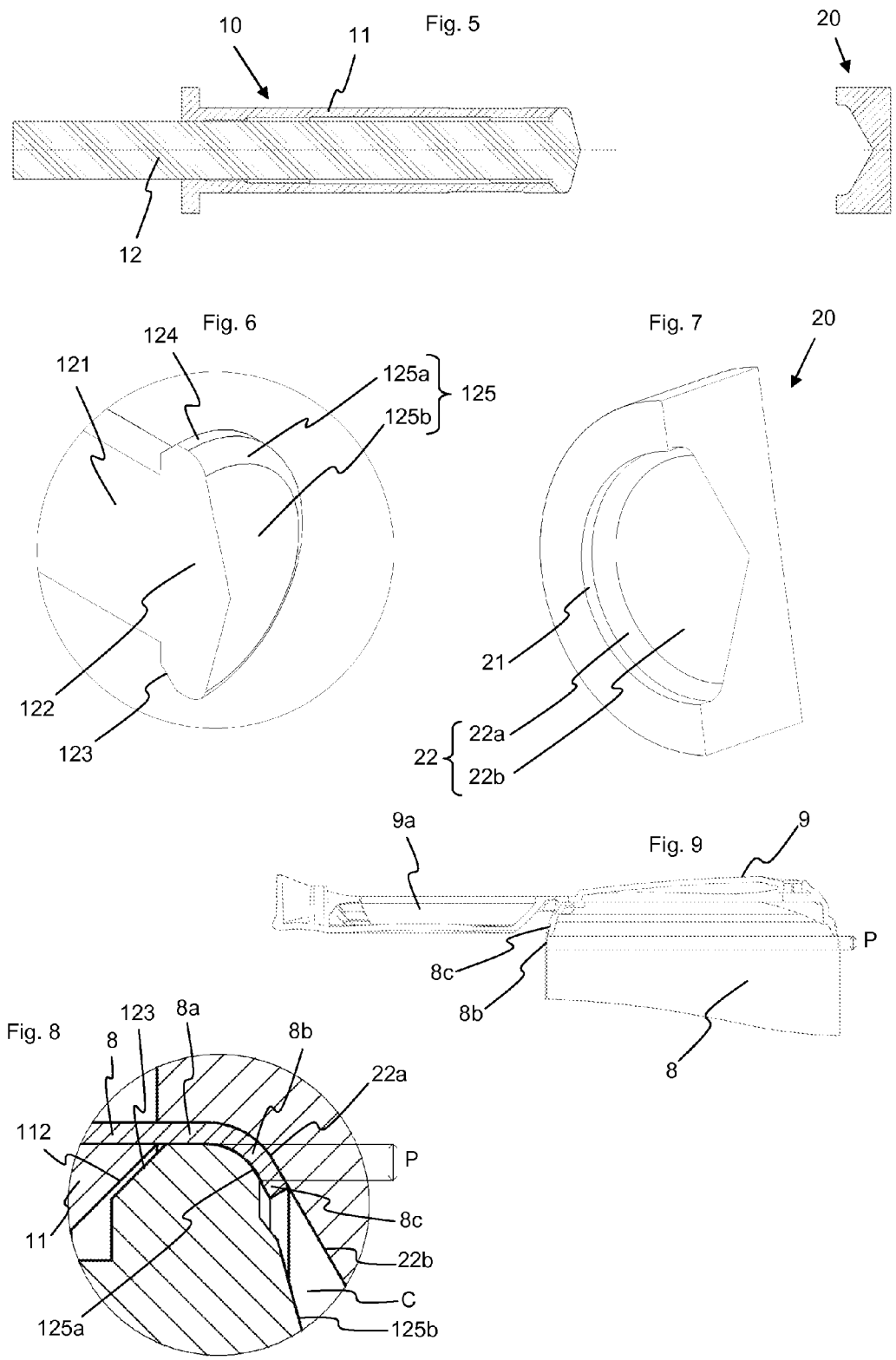

INJECTION-MOLDING PRESS

The invention relates to an injection molding press for overmolding by injection-molding a second part on a first part. The press includes a movable portion and a fixed portion, at least a first mold element being positioned on one of the portions of the press and at least a second mold element being positioned on the other portion of the press so as to form a cavity between the two mold portions when the press is closed. The first mold portion is provided with a first support surface and the second mold portion is provided with a second support surface, the two support surfaces being disposed in their respective mold portions so that in the closed position of the press, with a first part inserted in the first mold portion, at least a portion of the front end of the first part is clamped between the two support surfaces so as to form a tight seal for the cavity. The invention also relates to a method of using the press of the invention.

It is increasingly common to mold a second part on a first part by overmolding. This technique is used, for example, to inject dispensing heads atop skirts for manufacturing tubes. This requires the use of a press constituted by a fixed portion and a movable portion. One or more matrices are arranged on the fixed part, for example, and a same number of cylindrical cores are placed on the movable portion facing the matrices. The movable portion is moved away from the fixed portion, skirts are strung onto the cores, then the press is closed by moving the movable portion toward the fixed portion. The front ends of the skirts enter the cavity formed by the space located between the top face of the core and the bottom of the matrix. The dispensing head is then injected into the cavity. The injection pressure is in the order of 500 to 600 bar per matrix. It is therefore imperative to adjust the cylindrical surface of the core exactly to the internal diameter of the skirts and to adjust the cylindrical surface of the front portion of the matrix, the portion located toward the core, exactly to the external diameter of the skirts, in order to ensure a perfect seal for the cavity and thus prevent leakage of the injected mass. This surface accuracy involves substantial costs.

Documents FR 2532882 A1, FR 2527510 A1 and JP 5 008260 A all describe injection presses for overmolding a second part on a first part by injection molding. The presses have each a mobile portion and a fixed portion, a first mold element being arranged on one of the portions of the press and at least a second mold element being arranged on the other portion of the press so as to form a cavity between the two mold portions when the press is closed. The first mold portion is provided with a first support surface and the second mold portion is provided with a second support surface, the two support surfaces being disposed in their respective mold portions so that in the closed position of the press, with a first part inserted in the first mold portion and with the first support surface advanced in a working position, at least a portion of the front end of the first part is clamped between the two support surfaces so as to form a tight seal for the cavity. In the first document, the clamping is performed between the top of the cylindrical portion of the core and the peripheral edge of the matrix. In the second, which explains well the leakage problem mentioned above, the proposed solution is an annular flange located at the top of the core and which comes to clamp the top of the skirt against a corresponding support surface of the matrix. The application and removal of clamping are thus associated with the closing and opening of the press, respectively.

However, it can be useful to apply the clamping only after the mold has been closed, or to remove the clamping before opening the mold. The aim of the invention is therefore to allow clamping and removing the clamping between the time of closing the mold and the time of opening.

This aim is achieved in that the first support surface is movable in the first mold portion and in that moving means are provided for moving the first support surface between a retracted position and an advanced position, called working position, so that in the closed position of the press, with a first part inserted in the first mold portion and with the first support surface advanced in the working position, at least a portion of the front end of the first part is clamped between the two support surfaces so as to form a tight seal for the cavity for the entire duration of injection. Under these conditions, the tight sealing of the cavity is provided by the clamping of at least a portion of the front end of the first part between the two support surfaces. If the support surface is in the retracted position, closing the press does not cause any clamping of the first part. It is first necessary to move the first support surface to its working position to cause the clamping. Likewise, it is possible to remove the clamping after injection, but before opening the press. Since the first part is made of a plastic material, it is sufficiently deformed under the pressure exerted by the two support surfaces to provide a tight seal at their interface without requiring a particularly high accuracy for the support surfaces, nor, for that matter, for the rest of the mold portions.

In a preferred exemplary embodiment of the invention, the first mold portion is constituted by a core and the second mold portion is constituted by a matrix, the core being preferably arranged on the movable portion of the press and the matrix being preferably arranged on the fixed portion of the press.

When the first part is cylindrical, preferably, the core is constituted by a hollow cylindrical part and a valve disposed partially inside the cylindrical part, means being provided for moving the valve relative to the cylindrical part between a retracted position and an advanced position in which, when the press is closed, the first support surface is pressed against the second support surface with interposition of at least a portion of the front end of the first part. In this case, the first support surface can be constituted by a portion of the top face of the valve, and the second support surface by a portion of the bottom wall of the matrix. The first support surface and the second support surface have an annular shape surrounding the cavity.

Preferably, the valve is constituted by a rod ending at its front side with a head having a larger cross section, said head being provided with a cylindrical wall having the same external contour as the cylindrical part of the core, and being closed in the direction of the matrix by a top wall, the peripheral portion of which constitutes the first support surface and the center of which constitutes a portion of the molding surface for the second part and delimits a portion of the cavity.

The invention also relates to a method for using the press. This method comprises the following steps:
 (a) opening the press;
 (b) positioning a first part on or in the first mold portion;
 (c) closing the press;
 (d) injection molding the second part on the first part in the cavity formed between the two mold portions;
 (e) opening the press;
 (f) ejecting the finished object and returning to step (b).

The method of the invention is characterized in that, in step (c) or during a step (c1) prior to step (d) and following step (c), at least a portion of the front end of the first part is clamped between the first support surface and the second support surface so as to form a tight seal for the cavity.

Likewise, the clamping of the front end portion of the first part can be removed in step (e) or during a step (d1) following step (d) and prior to step (e).

The clamping in step (c) or (c1) and/or the removal of this clamping in step (e) or (d1) can be obtained by moving the first support surface relative to the second support surface so as to move them toward each other or away from each other. This clamping can be obtained in particular by moving the valve member relative to the cylindrical part.

The invention is described in more detail below using the figures which show:

FIG. 1: a cross sectional view of the core and the matrix, the press being closed and the valve being in the retracted position;

FIG. 2: a cross sectional view similar to FIG. 1, but in which the valve is in an advanced position;

FIG. 3: a view of the enlargement portion B of FIG. 1, the valve being in a retracted position;

FIG. 4: a view of the enlargement portion D of FIG. 2, the valve being in the forward position;

FIG. 5: a schematic view of the position of the matrix and the core when the press is open;

FIG. 6: a cross sectional isometric view of the valve head;

FIG. 7: a cross sectional isometric view of the matrix;

FIG. 8: an enlarged view of the clamping zone when the valve is in the advanced position; and FIG. 9: a view of an example of a tube obtained with the press and the method of the invention.

The device of the invention is intended to simplify a press for overmolding a second part on a first part. In the present example, a dispensing head (9), constituting the second part, is to be overmolded on a skirt (8), forming the first part, so as to form a tube formed as a single piece.

By convention, it is decided that the front portion of the core (10), of the cylinder (11), of the valve (12) or of the skirt (8) is the portion of the respective element that is located on the side of the matrix (20), that is to say, to the right on the figures. By analogy, the front portion of the matrix (20) corresponds to the portion of the matrix located on the side of the core (10).

Overmolding presses include a fixed portion and a movable portion each carrying a table; these elements are not shown. In general, the matrix (20) of the part to be overmolded is located on the fixed part, while the core (10) is located in the movable part. The matrix (20) constitutes the second mold element while the core (10) constitutes the first mold element.

The movable portion is first moved away from the fixed portion, as shown schematically in FIG. 5, and the first part, here, the skirt (8), is placed on the core (10). The press is then closed so that the core extends partially into the matrix, as well as the front end (8a, 8b, 8c) of the skirt (8).

According to the invention, the core (10) is constituted by, not only a cylindrical wall onto which the skirt (8) is slid, but also a valve (12). To this effect, the cylindrical wall is constituted by a hollow cylinder (11) within which the valve (12) can be moved by moving means which are not shown. These means can be constituted by hydraulic or pneumatic pistons or by cams, for example.

This valve (12) is essentially constituted by a rod (121) and by a head (122) which is wider than the rod. The rear face (123) of this head is partly frusto-conical, the taper widening toward the top face. This frustoconical wall is extended by a cylindrical wall (124) and a top wall (125). The contour of the cylindrical wall (124) corresponds to the contour of the outer face of the cylinder (11) and to the inner contour of the skirt. In general, the contour is a circle. However, it is possible to provide an ellipsoidal contour or any other suitable shape. In other words, the cylindrical wall (124) and the outer face of the cylinder have the same transverse cross section. The top wall (125) is divided into two portions: its circumferential edge (125a), which serves as a support surface, and its center (125b), which serves as a molding surface for the inner side of the second part, here, the dispensing head (9).

The front edge (112) of the cylinder (11), oriented toward the matrix (20), is also tapered, the taper widening towards the front, that is to say, in the direction of the matrix (20). This frustoconical surface (112) has a shape complementary to the frustoconical shape of the rear face (123) of the valve head. It serves as a backstop for the latter (123) when the valve is in the retracted position. The term (tron)conical means, not only the cone of revolution, but also other types of cone defined by the periphery of the skirt.

The outer periphery of the cylinder (11) and of the cylindrical wall (124) of the valve (12) corresponds substantially to the inner periphery of the skirts (8). In general, they are circles or ellipses.

The matrix (20) comprises a recess having a cylindrical wall (21) which is extended by a bottom wall (22). This bottom wall (22) has two functions: its circumferential edge (22a) serves as a support surface, while its center (22b) serves as a molding surface for the outer face of the second part, here, the dispensing head (9).

The inner periphery of the cylindrical wall (21) of the matrix corresponds substantially to the outer periphery of the skirts (8). The support surface (22a) of the matrix (20) has a shape complementary to the support surface (125a) of the valve.

In order to operate, the support surfaces (125a, 22a) must not be parallel to the displacement movement of the movable portion of the press and/or to that of the valve (12), otherwise, there would no clamping effect. In the examples presented here, the support surfaces are inclined towards the center relative to the direction of movement of the press and/or of the valve so that the front end (8a, 8b, 8c) of the skirt (8) tends to close. As seen in the example of tube shown on FIG. 9 obtained by the method, the inclination of the support surfaces does not need to be very important, and in particular, it does not need to be as important as that shown on FIGS. 1 to 5 and 8, which have only a schematic value.

The press of the invention operates as follows:

(a) The press is opened and the valve is retracted, if this was not already done.

(b) The first part, here, the skirt (8), is then placed on the cylinder (11). Means not shown limit the entry movement of the skirt beyond the desired position. These means can be, for example, length-setting rings as a function of the skirts used. The front end of the skirt protrudes slightly beyond the cylindrical wall (124) of the valve in the direction of the matrix.

(c) The press is then closed. The end (8a, 8b, 8c) of the skirt which extends beyond the cylinder (11) projects into the cylindrical portion (21) of the matrix, then deforms slightly following the shape inclined towards the center of the bottom wall (22). Meanwhile, the front end of the core, essentially the valve head (122), also projects into the recess of the matrix. When the press is closed, the position shown in FIGS. 1 to 3 is obtained. In this position, there is no sealing between the matrix and the core.

(c1) The valve (12) is now moved into the advanced position shown in FIGS. 2, 4 and 8. In this position, a portion (8b) of the front end of the skirt is thus clamped between the support surface (125a) of the valve and the support surface (22a) of the matrix. The pressure exerted by the support surface (125a) of the valve on the matrix (20) and on the portion (8b) of the skirt clamped between the two support surfaces (125a, 22a) is at least equal to the injection pressure, that is to say, in the order of 500 to 600 bar. The clamping zone (P) is marked in FIGS. 8 and 9. Since these two surfaces are annular, a seal is formed so as to tightly seal the cavity (C) in which the second part will be molded. This cavity (C) is formed by the space located between the center (125b) of the top wall of the valve and the center (22b) of the bottom wall of the matrix.

(d) The second part, here, the dispensing head (9), is injected into the cavity (C). During injection, the mass cannot escape from this cavity.

(d1) The valve (12) is retracted.

(e) The press is opened.

(f) The finished tube is ejected. The process can start over at step (b).

The retraction of the valve (12), instead of being performed in step (d1), can be performed between step (e) and step (f), in a step (e1). Thus, it is the opening of the press in step (e) that causes the clamping to be removed. The support surface (125a) is placed in the working position (clamping the portion of the front end of the first part 22a between it and the second support surface 22a) before the start of the injection, remains in this position throughout the injection, and is retracted only after the injection is completed. The tight seal formed by clamping the portion of the front end of the first part between the two support surfaces persists during the entire duration of injection.

If the core is not provided with a valve, the steps (c1) and (d1) and (e1) are not performed. The support surfaces are moved toward each other or away from each other solely by the closing or opening of the press in steps (c) and (e).

To increase the fusion interface between the first part, here, the skirt (8), and the second part, here, the dispensing head (9), it is possible to provide a portion (8c) of the skirt beyond the portion (8b) clamped between the two support surfaces, this front end (8c) thus projecting into the overmolding cavity. This way, overmolding does not occur only in the area of the front edge of the skirt, as is the case in FIG. 4, but also on the inner surface of the portion (8c) of the skirt that projects from the clamping zone between the support surfaces into the overmolding cavity. This is the case with the embodiment of FIG. 8.

To ensure sealing of the press, it is thus sufficient that the annular portion forming the support surface (125a) of the valve head is substantially adjusted to the geometry of the support surface (22a) of the matrix. Since a portion (8b) of the front end of the skirt is interposed between these two surfaces, accuracy does not need to be very high.

Neither the surface accuracy of the cylinder (11), nor the surface accuracy of the cylindrical portion (124) of the valve head and that of the cylindrical portion (21) of the matrix, play any role in the sealing. The cost for manufacturing these parts is thus greatly reduced.

This method is not limited to the overmolding of a circular part on the front face of a cylindrical part. The method is very easily adaptable to the overmolding of a dispensing head (9) closing the top of the cylinder constituting the skirt (8) and provided with a hinged cap (9a) positioned eccentrically relative to the skirt, like the tube shown on FIG. 9.

More generally, the method can be applied to any first part, even a non-cylindrical part, having a front end that can be wedged between two support surfaces, one belonging to the movable portion and the other to the fixed portion of the press, so that the portion clamped between the two support surfaces forms a tight seal for the overmolding cavity. Due to the clamping between the two support surfaces to which this front end is subjected, it is deformed on its sides so as to ensure the lateral sealing between the two support surfaces. To this effect, the movement of the valve does not need to take place parallel to the direction of movement of the movable portion of the press.

The method is intended for overmolding by injection-molding a plastic material on another plastic material. In general, the two materials are compatible, that is to say, they merge together during molding. However, it is also possible to provide incompatible materials if the geometry of the two parts is such that anchoring means are formed. In particular, it is possible to provide anchoring means on the portion (8c) of the skirt that projects into the cavity beyond the clamping zone (8b, p).

The movable valve (12) makes it possible to compensate for variations in the thicknesses of the skirts due to extrusion tolerances as well as in the heights of the skirts due to length cutting tolerances.

LIST OF REFERENCES

8 First part (skirt)
8a Portion of the skirt which projects into the matrix, without reaching the clamping zone
8b Portion of the skirt located in the clamping zone
8c Portion of the skirt located beyond the clamping zone
9 Second part, i.e., part to be overmolded (dispensing head)
10 Core (first mold portion)
11 Cylinder
12 Valve
121 Rod of the valve
122 Head of the valve
123 Conical rear wall of the head
124 Cylindrical wall of the head
125 Top wall of the head
125a Support surface of the top wall
125b Molding surface
20 Matrix (second mold portion)
21 Cylindrical wall
22 Bottom wall
22a Support surface
22b Molding surface
P Clamping zone
C Cavity for injection of the second part

The invention claimed is:

1. Injection-molding press for overmolding by injection-molding a second part on a first part, comprising:
   a movable portion and a fixed portion,
   at least a first mold element arranged on one of the portions of the press and at least a second mold element arranged on the other portion of the press so as to form a cavity between the first and second mold elements when the press is closed, wherein a closing movement comprises a movement of the movable portion toward the fixed portion in a closing direction,
   the first mold element being provided with a first support surface and the second mold element being provided with a second support surface, the first and second support surfaces being disposed in their respective mold element so that, in the closed position of the press with a first part inserted in the first mold element, at least a portion of a front end of the first part is clamped between the first and second support surfaces so as to form a tight seal for the cavity, wherein the first support surface is movable in the first mold element and the first support surface is movable in a direction parallel to the closing direction between a retracted position and an advanced position, called working position, so that in the closed position of the press with a first part inserted into the first mold element and with the first support surface in the advanced position, at least a portion of the front end of the first part is clamped between the first and second support surfaces so as to form a tight seal for the molding cavity during the entire duration of injection.

2. Press according to claim 1, wherein the first mold element comprises a core and the second mold element is constituted by a matrix.

3. Press according to claim 2, wherein the core is arranged on the movable portion of the press and the matrix is arranged on the fixed portion of the press.

4. Injection-molding press for overmolding by injection-molding a second part on a first part, comprising:
a movable portion and a fixed portion,
at least a first mold element arranged on one of the portions of the press and at least a second mold element arranged on the other portion of the press so as to form a cavity between the first and second mold elements when the press is closed,
the first mold element being provided with a first support surface and the second mold element being provided with a second support surface, the first and second support surfaces being disposed in their respective mold elements so that, in the closed position of the press with a first part inserted in the first mold element, at least a portion of a front end of the first part is clamped between the first and second support surfaces so as to form a tight seal for the cavity,
wherein the first support surface is movable in the first mold element and the first support surface is movable between a retracted position and an advanced position, called working position, so that in the closed position of the press with a first part inserted into the first mold element and with the first support surface in the advanced position, at least a portion of the front end of the first part is clamped between the first and second support surfaces so as to form a tight seal for the cavity during the entire duration of injection,
wherein the first mold element comprises a core and the second mold element is constituted by a matrix,
wherein the core comprises a hollow cylindrical part and a valve disposed partially inside the cylindrical part, the valve being movable relative to the cylindrical part between a retracted position and an advanced position in which, when the press is closed, the first support surface is pressed against the second support surface with the interposition of at least a portion of the front end of the first part.

5. Press according to claim 4, wherein the first support surface includes a portion of the top face of the valve, and the second support surface includes a portion of the bottom wall of the matrix.

6. Press according to claim 5, wherein the first support surface and the second support surface have an annular shape surrounding the cavity.

7. Press according to claim 4, wherein the valve comprises a rod terminated at its front side by a head having a larger cross section, said head being provided with a cylindrical wall having the same external contour as the cylindrical portion of the core and being closed in the direction of the matrix by a top wall, the peripheral portion of which constitutes the first support surface and the center of which constitutes a portion of the molding surface for the second part and delimits a portion of the cavity.

8. First mold element for a press, comprising a first support surface movable in the first mold element for clamping, between the first support surface and a corresponding support surface of a second mold element, at least a portion of the front end of a first part inserted in the first mold element so as to form a tight seal for the cavity during the entire duration of injection;
wherein a part of the first mold element is movable toward the second mold element to take a first position when the press is closed;
and wherein, in the first position of the part of the first mold element, the first support surface is movable relative to the part of the first mold element between a retracted position and an advanced position, called working position, and is configured to cooperate with a corresponding support surface of the second mold element so that, with the first support surface in the advanced position, the portion of the front end of the first part inserted into the first mold element is clamped between the first and second support surfaces.

9. First mold element according to claim 8, comprising a core constituted by a hollow cylindrical part and a valve disposed partially inside the cylindrical part, the valve being movable relative to the cylindrical part between a retracted position and an advanced position in which, when the press is closed in the direction of the matrix, the first support surface is pressed against the second support surface with the interposition of at least a portion of the front end of the first part.

10. First mold element according to claim 9, wherein the first support surface is constituted by a portion of the top face of the valve.

11. First mold element according to claim 10, wherein the first support surface has an annular shape.

12. First mold element according to claim 9, wherein the valve comprises a rod terminated at its front by a head having a larger cross section, said head being provided with a cylindrical wall having the same external contour as the cylindrical part of the core and being closed in the direction of the matrix by a top wall, the peripheral portion of which constitutes the first support surface and the center of which constitutes a portion of the molding surface for the second part and delimits a portion of the cavity.

13. Method for overmolding a second part on a first part in a press,
wherein the press is the injection-molding press according to claim 1,
wherein the method comprises the following steps:
a. opening the press;
b. positioning a first part on or in the first mold element;
c. closing the press;
d. injection-molding the second part onto the first part in the cavity formed between the first and second elements;
e. opening the press;
f. ejecting the finished object and returning to step (b),
wherein, in step (c) or during a step (c1) following step (c) and prior to step (d)), at least a portion of the front end of the first part is clamped between the first support surface and the second support surface so as to form a tight seal for the cavity, and in step (e) or during a step (d1) following step (d) and prior to step (e), the clamping of the front end portion of the first part is removed.

14. The method as claimed in claim 13, wherein at least one of the clamping of step (c) or (c1) and the removal of this clamping in step (e) or (d1) is obtained by moving the first support surface relative to the second support surface.

15. The method of claim 13,
wherein the first mold element comprises a core and the second mold element is constituted by a matrix,
wherein the core comprises a hollow cylindrical part and a valve disposed partially inside the cylindrical part, the valve being movable relative to the cylindrical part between a retracted position and an advanced position in which, when the press is closed, the first support surface is pressed against the second support surface with the interposition of at least a portion of the front end of the first part,
wherein at least one of the clamping of step (c) or (c1) and the removal of this clamping in step (e) or (d1) is obtained by moving the valve relative to the cylindrical part.

16. The method of claim 14,
wherein the first mold element comprises a core and the second mold element is constituted by a matrix,
wherein the core comprises a hollow cylindrical part and a valve disposed partially inside the cylindrical part, the valve being movable relative to the cylindrical part between a retracted position and an advanced position in which, when the press is closed, the first support surface is pressed against the second support surface with the interposition of at least a portion of the front end of the first part,
wherein at least one of the clamping of step (c) or (c1) and the removal of this clamping in step (e) or (d1) is obtained by moving the valve relative to the cylindrical part.

17. Press according to claim 3, wherein the core comprises a hollow cylindrical part and a valve disposed partially inside the cylindrical part, the valve being movable relative to the cylindrical part between a retracted position and an advanced position in which, when the press is closed, the first support surface is pressed against the second support surface with the interposition of at least a portion of the front end of the first part.

18. Press according to claim 17, wherein the first support surface includes a portion of the top face of the valve, and the second support surface includes a portion of the bottom wall of the matrix.

19. Press according to claim 18, wherein the first support surface and the second support surface have an annular shape surrounding the cavity.

20. Press according to claim 17, wherein the valve comprises a rod terminated at its front side by a head having a larger cross section, said head being provided with a cylindrical wall having the same external contour as the cylindrical portion of the core and being closed in the direction of the matrix by a top wall, the peripheral portion of which constitutes the first support surface and the center of which constitutes a portion of the molding surface for the second part and delimits a portion of the cavity.

21. Method for overmolding a second part on a first part in a press,
wherein the press is an injection-molding press for overmolding by injection-molding a second part on a first part, comprising:
a movable portion and a fixed portion,
at least a first mold element arranged on one of the portions of the press and at least a second mold element arranged on the other portion of the press so as to form a cavity between the first and second mold elements when the press is closed,
the first mold element being provided with a first support surface and the second mold element being provided with a second support surface, the two support surfaces being disposed in their respective mold elements so that, in the closed position of the press with a first part inserted in the first mold element, at least a portion of a front end of the first part is clamped between the first and second support surfaces so as to form a tight seal for the cavity,
wherein the first support surface is movable in the first mold element and the first support surface is movable between a retracted position and an advanced position, called working position, so that in the closed position of the press with a first part inserted into the first mold element and with the first support surface in the advanced position, at least a portion of the front end of the first part is clamped between the first and second support surfaces so as to form a tight seal for the cavity during the entire duration of injection,
wherein the first mold element comprises a core and the second mold element is constituted by a matrix,
wherein the core comprises a hollow cylindrical part and a valve disposed partially inside the cylindrical part, the valve being movable relative to the cylindrical part between a retracted position and an advanced position in which, when the press is closed, the first support surface is pressed against the second support surface with the interposition of at least a portion of the front end of the first part,
wherein the method comprises the following steps:
a. opening the press;
b. positioning a first part on or in the first mold element;
c. closing the press;
d. injection-molding the second part onto the first part in the cavity formed between the first and second mold elements;
e. opening the press;
f. ejecting the finished object and returning to step (b),
wherein, in step (c) or during a step (c1) following step (c) and prior to step (d)), at least a portion of the front end of the first part is clamped between the first support surface and the second support surface so as to form a tight seal for the cavity, and in step (e) or during a step (d1) following step (d) and prior to step (e), the clamping of the front end portion of the first part is removed,
wherein at least one of the clamping of step (c) or (c1) and the removal of this clamping in step (e) or (d1) is obtained by moving the valve relative to the cylindrical part.

* * * * *